United States Patent

Sugimura

Patent Number: 5,151,828
Date of Patent: Sep. 29, 1992

[54] INSIDE REAR VIEW MIRROR FOR A VEHICLE

[75] Inventor: Naomi Sugimura, Shimada, Japan

[73] Assignee: Ltd. Murakami Kaimeido Co., Shizuoka, Japan

[21] Appl. No.: 532,966

[22] Filed: Jun. 4, 1990

[30] Foreign Application Priority Data

Jul. 14, 1989 [JP] Japan ............... 1-82152[U]

[51] Int. Cl.⁵ ............................................. B60R 1/04
[52] U.S. Cl. .................... 359/871; 248/549; 248/481; 248/222.1; 248/224.1
[58] Field of Search ............................ 350/631, 632; 248/475.1, 477, 478, 479, 480, 220.4, 221.1, 221.3, 221.4, 222.1, 549, 900, 481, 223.4, 224.1, 224.2; 359/871, 872

[56] References Cited

U.S. PATENT DOCUMENTS

| 3,131,251 | 4/1964 | Ryan | 248/475.1 |
| 4,254,931 | 3/1981 | Aiken . | |
| 4,668,059 | 5/1987 | Ohyama | 350/632 |
| 4,936,533 | 6/1990 | Adams et al. | 248/222.1 |
| 4,995,581 | 2/1991 | Koiwai et al. | 248/549 |

FOREIGN PATENT DOCUMENTS

| 55-6161 | 1/1980 | Japan . | |
| 57-55239 | 4/1982 | Japan . | |
| 58-24595 | 5/1983 | Japan | 248/549 |
| 59-164244 | 9/1984 | Japan . | |
| 1-176551 | 12/1989 | Japan . | |
| 1-176552 | 12/1989 | Japan . | |
| 1134353 | 11/1968 | United Kingdom | 248/549 |
| 1196266 | 6/1970 | United Kingdom | 248/476 |
| 1196267 | 6/1970 | United Kingdom | 248/481 |

Primary Examiner—Bruce Y. Arnold
Assistant Examiner—R. D. Shafer
Attorney, Agent, or Firm—Michael J. Striker

[57] ABSTRACT

A rear view mirror mounted on an interior surface of a vehicle has a base, a frame and a stay. The frame arranged on an upper surface of the stay contains an elastic engaging means including an arc-shaped leaf spring and on an inside wall surface of a cavity of the base, dents are formed for elastically receiving stoppers of respective ends of the arc-shaped leaf spring when the frame is engaged in the cavity. When an external force is applied to the stay, the stay easily drops out of the base due to removing the stopper from the dent.

7 Claims, 7 Drawing Sheets

INSIDE REAR VIEW MIRROR FOR A VEHICLE

BACKGROUND OF THE INVENTION

1. Field of Invention

This invention relates to an inside rear view mirror for a vehicle capable of dropping out when an external force in excess of a predetermined force is applied.

2. Description of The Prior Art

Various types of rear view mirrors mounted on an interior surface of a vehicle are known Japanese Utility Model Registration Application Laid-Opened Publication No. Hei 1-176551 discloses an inside rear view mirror in which a stay is attached to a base secured to the interior surface of the vehicle, by a base stay and an attaching mechanism comprising a disc spring and a set screw and contained between the base stay and the stay. With a mirror of the type, the base is preliminary secured to an interior surface of a front glass, a front periphery of an interior ceiling of the vehicle or the like, while the base stay is mounted on an upper surface of the stay by the set screw, interposed with the disc screw and an engaging pawl of a rear end of the base stay is engaged in a fastening taper recess provided on the base.

For the inside rear view mirror having above described attaching mechanism, the setting of a position where the mirror is mounted is restricted to a position that insures that a dropping out torque should act on the disc screw portion with centering around a pivot when an external force is applied to the pivot of the edge of the stay a an angle of 45 degrees from beneath. There are some cases in which the setting of a position as described above intereferes with a driver's safe driving since a porotion of the driver's forward sight is blocked by the inside rear view mirror.

SUMMARY OF THE INVENTION

An object of the invention is to provide an inside rear view mirror which puts no restriction for setting any desirable position of the mirror. The other object of the invention is to provide the inside rear view mirror capable of being set at the place where the sight of the driver is not directly interrupted, and capable of easily dropping out when an upward acting impact loading is applied to the stay edge.

To achieve above described objects, according to this invention, the inside rear view mirror is provided with a bent leaf spring interposed in a frame formed between a base and an upper surface of a stay in place of a disc screw-type attaching mechanism.

In an inside rear view mirror according to this invention, a stay is removably mounted to a base secured to the fixed portion near the upper portion of the front glass of the vehicle or the front periphery of the interior ceiling of the vehicle. Above described mounting mechanism comprises a cavity formed on a bottom surface of a base, a frame formed on an upper surface of a stay to be received in said cavity. A first semi-spherical dent is provided on an inside wall surface of said cavity, a semi-spherical projection is formed on the front end of the frame to engage with said semi-spherical dent, and a pair of the second semi-spherical dents, respectively, are formed at opposite positions on the inside wall surface of the cavity. These positions are spaced apart from each other at the same distance with centering around the first semi-spherical dent. An arch shape leaf spring is mounted in the frame, and a stopper is arranged to near both ends of the leaf spring and penetrates through the frame wall so that the edge portion thereof is resiliently received by the second semi-spherical dent.

According to the invention, there are provided two embodiments of inside rear view mirrors in which the frame is uniformed on the upper surface of the stay, and in which the frame separately formed from the stay is fastened on the upper surface of the stay by a screw when the mirror is assembled respectively. In a first case, the end portion of the screw threadably penetrated into the cavity of the base from the lower direction of the stay, pushes a central portion of the leaf spring stoppers provided at both sides of the spring threadably resiliently engage the second semi-pspherical dents on the inside wall surface of the cavity due to a recovery action of the bent leaf spring. In the second case, an end portion of the screw does not contact the leaf spring disposed in the frame since the screw which is penetrated from the lower portion of the stay threadedly engages the central portion of the frame to merely uniformly fasten the frame with the stay. In any of those cases, when the stay is mounted on the base, the position is so adjusted that the semi-spherical projection on the front end of the frame engages the first semi-spherical dent of the inside wall surface of the cavity and the frame at the upper portion of the stay is pushed in the cavity. Thereby the assembling of the mirror is easily finished since the leaf spring functions to allow both of the stoppers provided with a projecting tendency to resiliently engage the second semi-spherical dent of the inside wall surface of the cavity. When the impact loading in excess of a predetermined magnitude is applied after the inside rear view mirror is mounted, there is no relation to the functional direction of the external force from the lower direction, the resiliently engaging means is released from the engagement of itself to permit the stay to easily drop out of the base. Therefore in this invention, there is no restriction as to the mounting position of the mirror as required by the conventional mirror, and the inside rear view mirror can so be mounted as to prevent adverse effect on the driver's sight.

BRIEF DESCRIPTION OF THE DRAWINGS

These and other objects, features and advantages of the present invention will become more apparent from the following description of a preferred embodiment taken in conjunction with the accompanying drawings, in which.

DETAILED DESCRIPTION OF PREFERRED EMBODIMENTS

Figure 1:
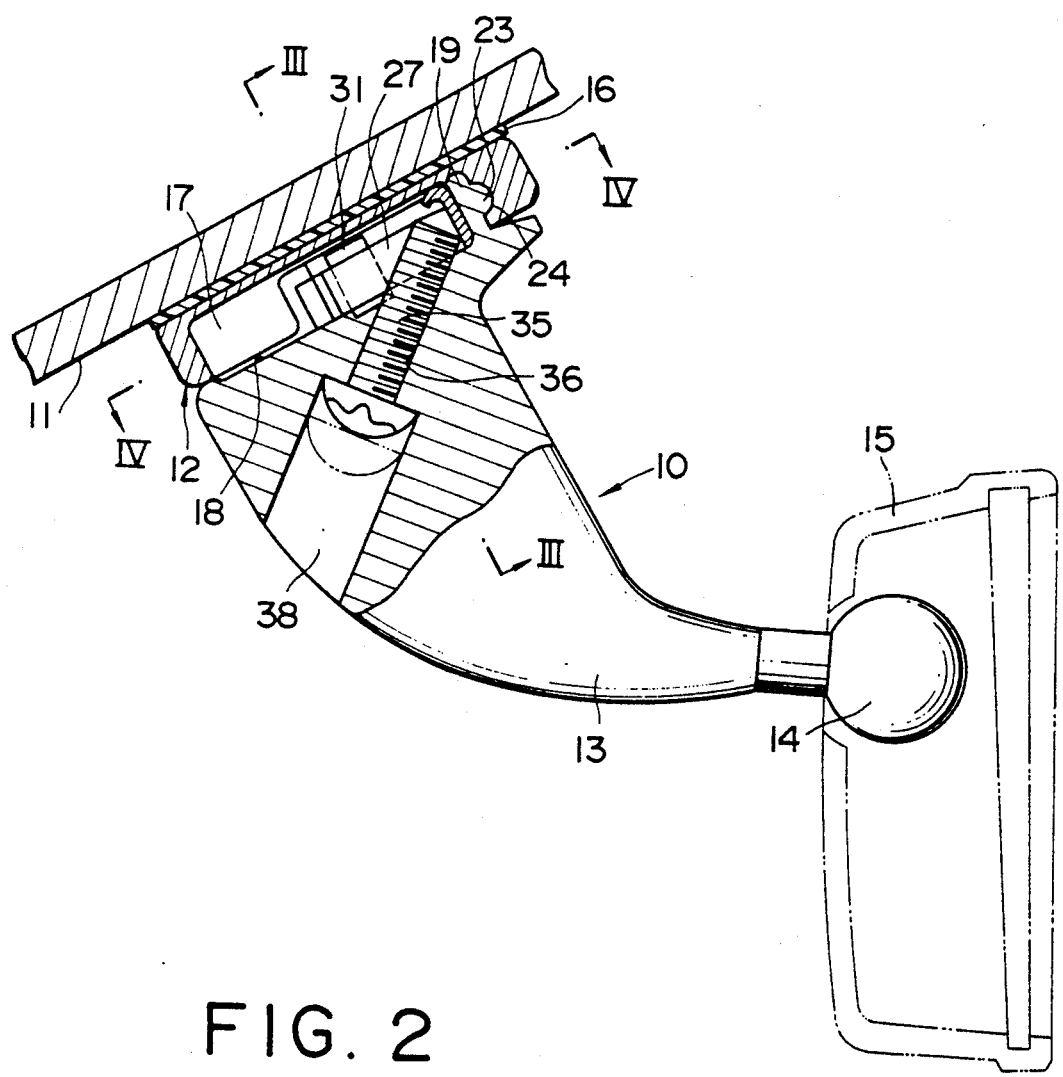
FIG. 1 is a side view of an inside rear view mirror for a vehicle according to the invention with a cut-away portion where the stay is attached.

The present invention will now be described in detail with reference to the drawings, FIGS. 1 to 7 illustrate the first embodiment of an assembly 10 of an inside rear view mirror, the assembly 10 has a base 12 mounted on an interior surface 11 of a vehicle, a stay 13 engaged to the base 12 and a mirror case 15 supported by an end pivot 14 of the stay 13. The interior surface 11 shown in FIG. 1 illustrates an inner surface of a front glass of the vehicle, however, a position to where the base 12 is mounted is preferable set near to a front periphery of an interior ceiling of the vehicle.

Figure 2:
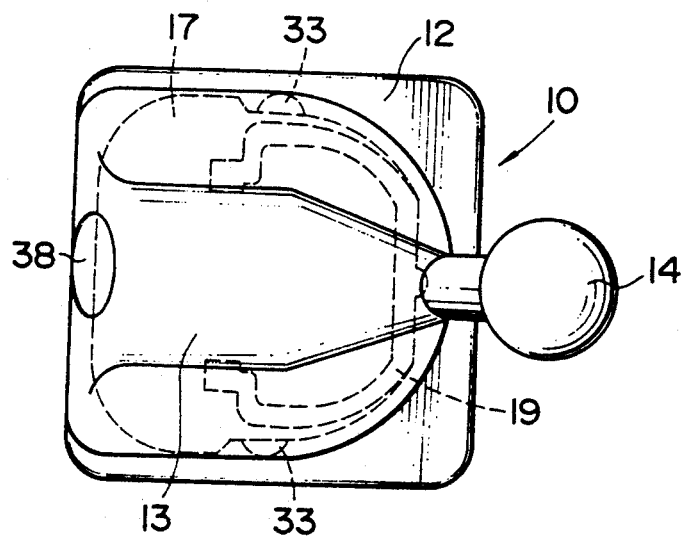
FIG. 2 is a bottom view of the inside rear view mirror of FIG. 1.
Figure 3:
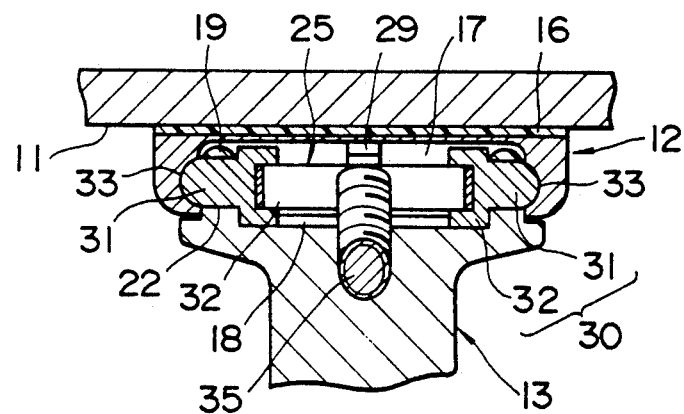
FIG. 3 is a front cross-sectional view of the inside rear view mirror taken along on line III—III of FIG. 1.

An upper surface of the base 12 is a plane surface for easily mounting on the surface of the vehicle front glass or the like and is secured by an adhesion layer 16. The bottom surface of the base, as shown in FIGS. 1 to 3, has a cavity 17. The cavity 17 receives an U-shape frame 19 projecting from an upper surface 18 of the stay when the stay faces to the base. Dowels 20 to determining the position to where the mirror is mounted are provided in three locations on the upper end surface of the frame 19 and recesses or small holes 21 engaged with the dowels 20 are correspondingly provided in the cavity 17 (FIGS. 4 to 7).

A semi-spherical projection 23 is mounted on an end of the frame 19 and, correspondingly, on an inner surface of the cavity 17, the first semi-spherical dent 24 is formed. In the frame 19, elastic engaging means 25 capable of resiliently contacting the inside wall surface of the cavity is provided. The elastic engaging means 25 comprises an arch shape leaf spring 27 disposed in the frame 19, two stoppers 30, 30 arranged resiliently closely at near both ends of the leaf spring 27. Second semi-spherical dents 33, 33 are formed on the inside wall surface of the cavity 17 of the base to receive the semi-spherical convexes 31, 31 of the stoppers 30 therein, and an engaging member 35 such as a screw or a synthetic pin penetrated through a hole 36 extends from below to the upper surface 18 of the stay.

Figure 4:
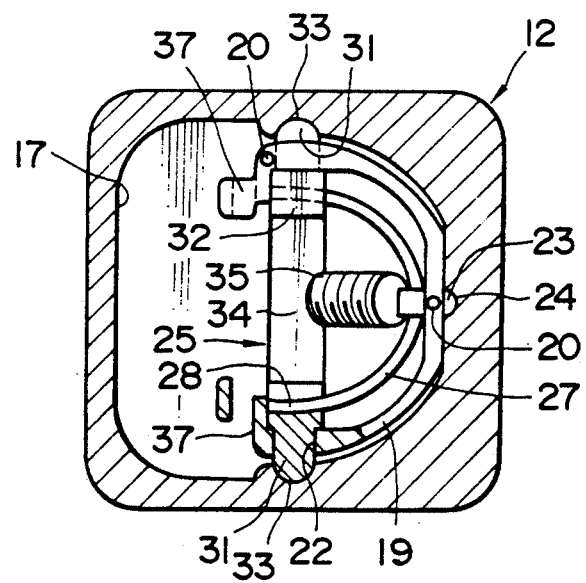
FIG. 4 is a horizontal cross sectional view of the inside rear view mirror taken along line IV—IV in FIG. 1.
Figure 5:
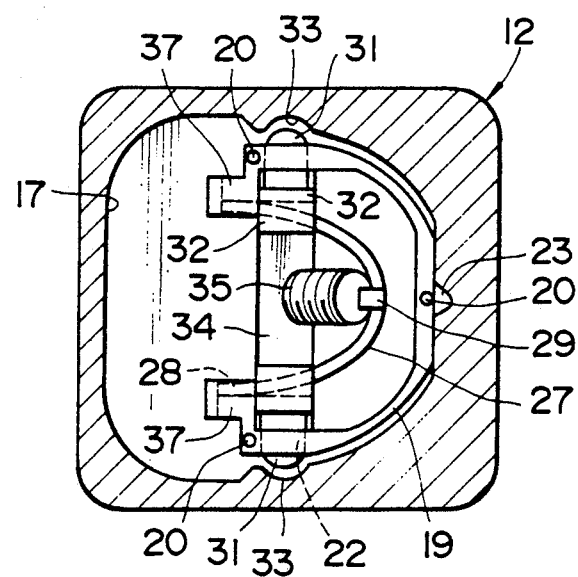
FIG. 5 is a horizontal plan view showing a condition of the leaf spring of the inside rear view mirror according to the invention just after the stay is engaged into the base.
Figure 6:
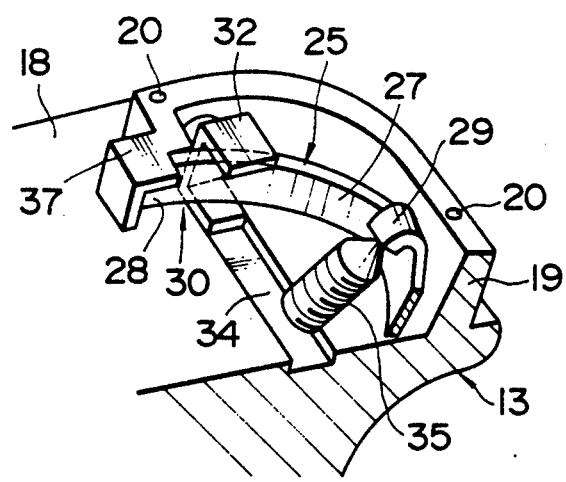
FIG. 6 is a partial perspective view of a portion of the mirror shown in FIG. 5.
Figure 7:
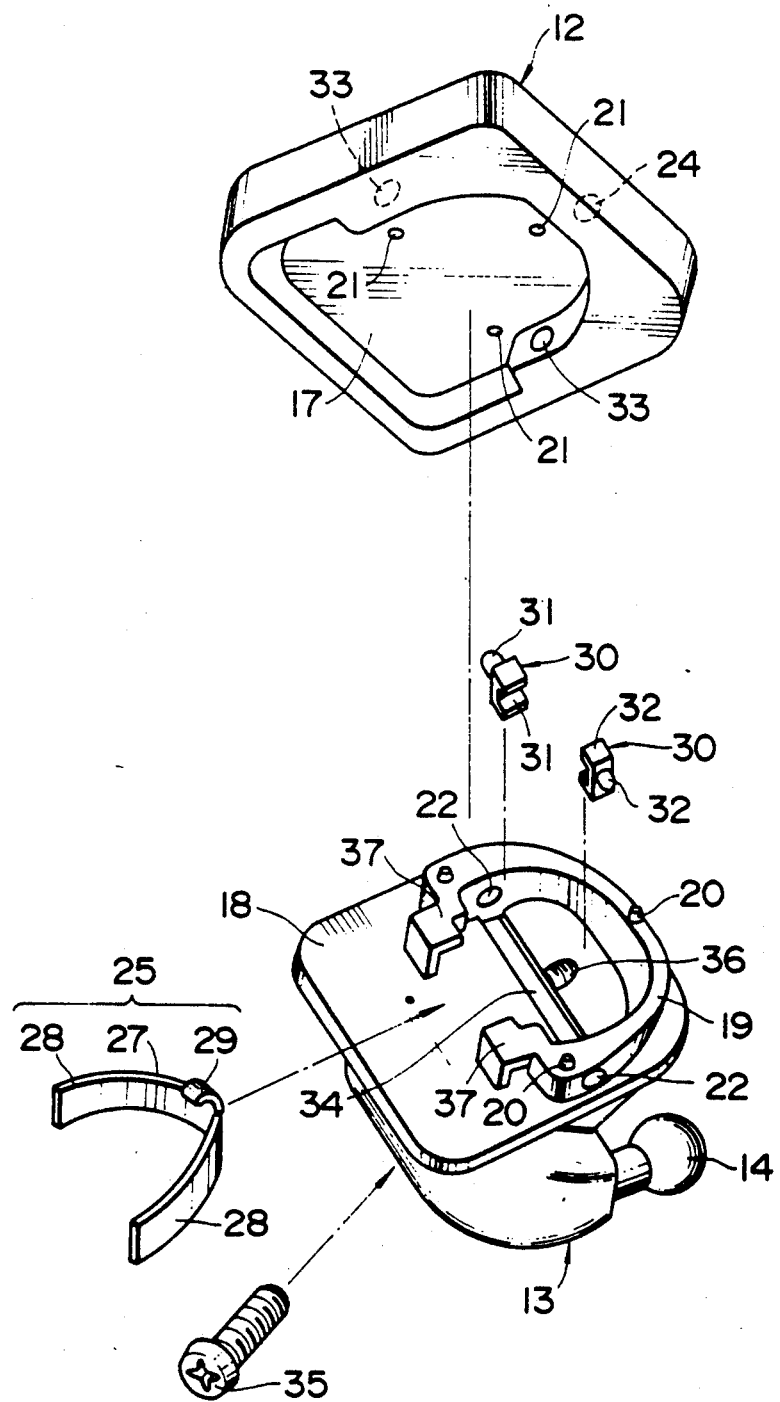
FIG. 7 is an exploded perspective view of the inside rear view mirror shown in FIG. 1.
Figure 8:
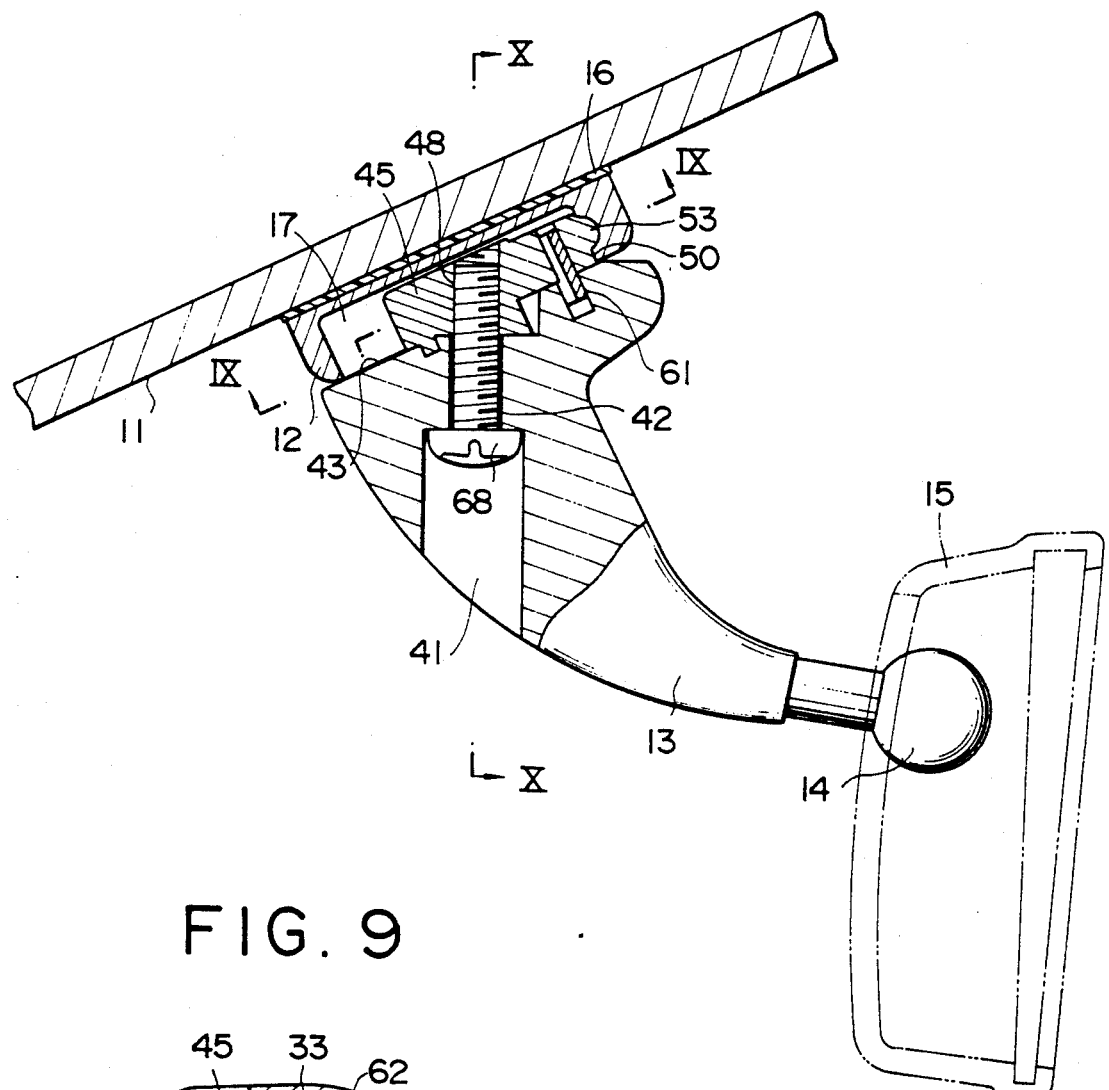
FIG. 8 is a side elevational view of the inside rear view mirror for the vehicle showing the portion to where the stay is attached of a modified embodiment of an inside rear view mirror according to the present invention.
Figure 9:
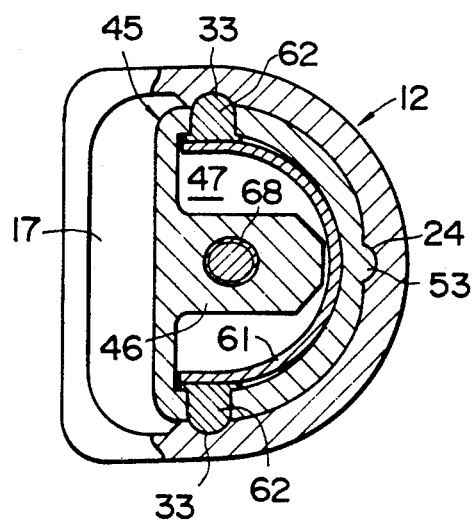
FIG. 9 is a horizontal cross-sectional plan view along line IX—IX of FIG. 8.
Figure 10:
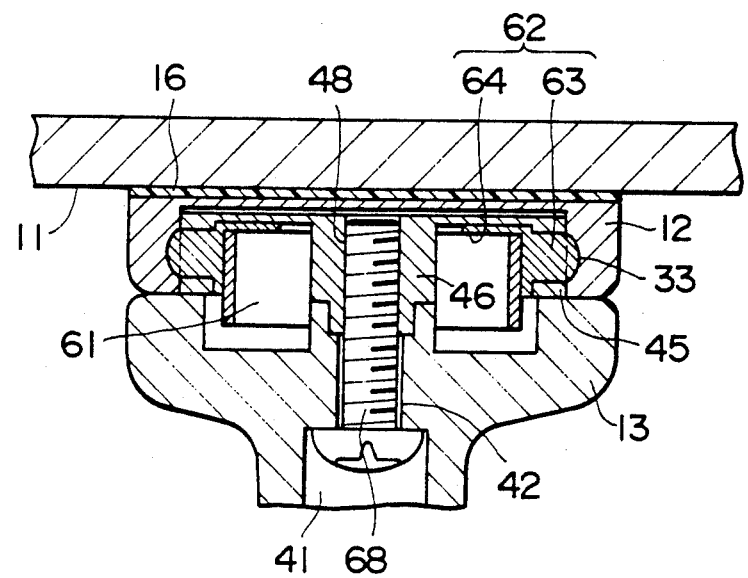
FIG. 10 is a perpendicular cross sectional plan view along line X—X of FIG. 8.
Figure 11:
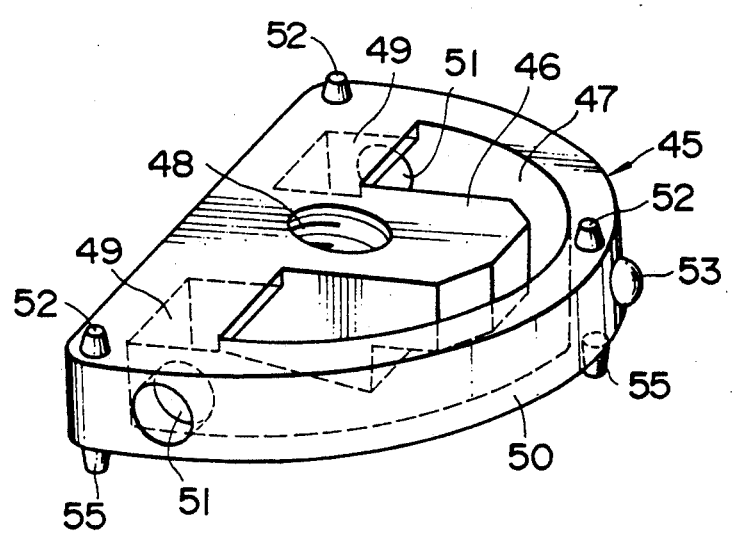
FIG. 11 is an enlarged perspective view of a frame formed separately from the stay.

On a center of the leaf spring 27, for preventing the leaf spring from chattering to upper and lower directions, a projecting piece 29 is formed for contacting the plane surface of the cavity 17 when the mirror is set (FIGS. 5 and 6). Further, the stopper 30 comprises a hook shape basement 32 and a semi-spherical convex 31 and the hook shape basement 32 is slidably inserted into a guide groove 34 formed on the upper surface 18 of the stay. Further, as shown in FIG. 4, on both ends of the frame 19, a through hole 22, 22 through which a respective semi-spherical convex 31, 31 of the stopper extends to the base, is provided, and a rib 37 is also formed to provisionally fasten both ends 28, 28 of the leaf spring 27 in the frame before the stay 13 is set. In FIG. 1, numeral 38 denotes a large radial dimentioned hole provided as view from below of the stay.

In assembling the inside rear view mirror, the base 12 is adhered to the upper portion of the front glass of the vehicle or the inner surface of the front periphery of the ceiling. While, a sub-assembled stay in which the leaf spring 27 is provisionally fastened by the portion of the rib 37 in the frame 19 on the upper surface of the stay 18 is prepared (FIG. 5). In a condition that the sub-assembled stay is provisionally fastened, as shown in FIG. 6, the end of the engaging member 35 pushed from the respective lower surface of the stay is softly pushed to contact with the center of the leaf spring 27, and both leg portions 28, 28 of the leaf spring 27 to engage to the provisionally fastening rib 37.

As above described, after the leaf spring 27 is provisionally fastened, the semi-spherical projection 23 of the frame side is engaged in the first dent 24 in the cavity of the stay, and simultaneously the frame 19 is engaged into the cavity 17 of the stay side while the dowel 20 on the upper surface of the frame is engaged in the recess 21 in a surface of the cavity, thereby the position where the mirror is mounted is determined. Thus, when the engaging member 35 is threaded into or pushed thereinto and the end thereof is put up to the perspective upper direction, the bent portion of the leaf spring 27 approaches to the inside wall of the frame, and in accordance therewith, both leg portions 28, 28 are removed from the rib 37, 37 for provisional fastening. When the provisional fastening is released, since both leg portions 28, 28 extend outwardly because of resiliency of the leaf spring, the stopper 30, 30 guided in the groove 34, moves to permit the semi-spherical convex 31, 31 at the end thereof to engage the second dent 33, 33 provided on the side wall of the cavity. Thereby the stay is set on the frame as shown in FIGS. 1, 3 and 4.

When the stay is set as above described, the stay is supported by the engagement of the semi-spherical dent 24 in the cavity 17 with the semi-spherical projection 23 of the frame 19 and by the engagement of the second semi-spherical dent 33, 33 of the inside wall of the cavity with the semi-spherical convex 31, 31 of the elastic engaging means 25. When an impact loading is applied to the pivot 14 at the end of the stay holding the inside rear view mirror, at least one of semi-spherical convex 31 of the elastic engaging means 25 is released to drop the stay out.

As shown in the drawings, the screw is used as the engaging member 35, however, a synthetic pin may be used instead thereof. When a synthetic pin is used, it is capable of one-push mounting and further the condition of closing the hole without exploding the through hole provided in the lower porotion of the stay is also possible.

FIGS. 8 to 12 show the second embodiment of an inside rear view mirror of invention. In this embodiment, the stay has a separately formed frame on the upper surface thereof assembled to the base. The base 12 has substantially the same shape as in the first embodiment and is adhered to the interior surface 11. A large radial dimentioned hole 41 and a threaded hole 42 extend to a center of an upper surface 43 of the stay from beneath.

Figure 12:
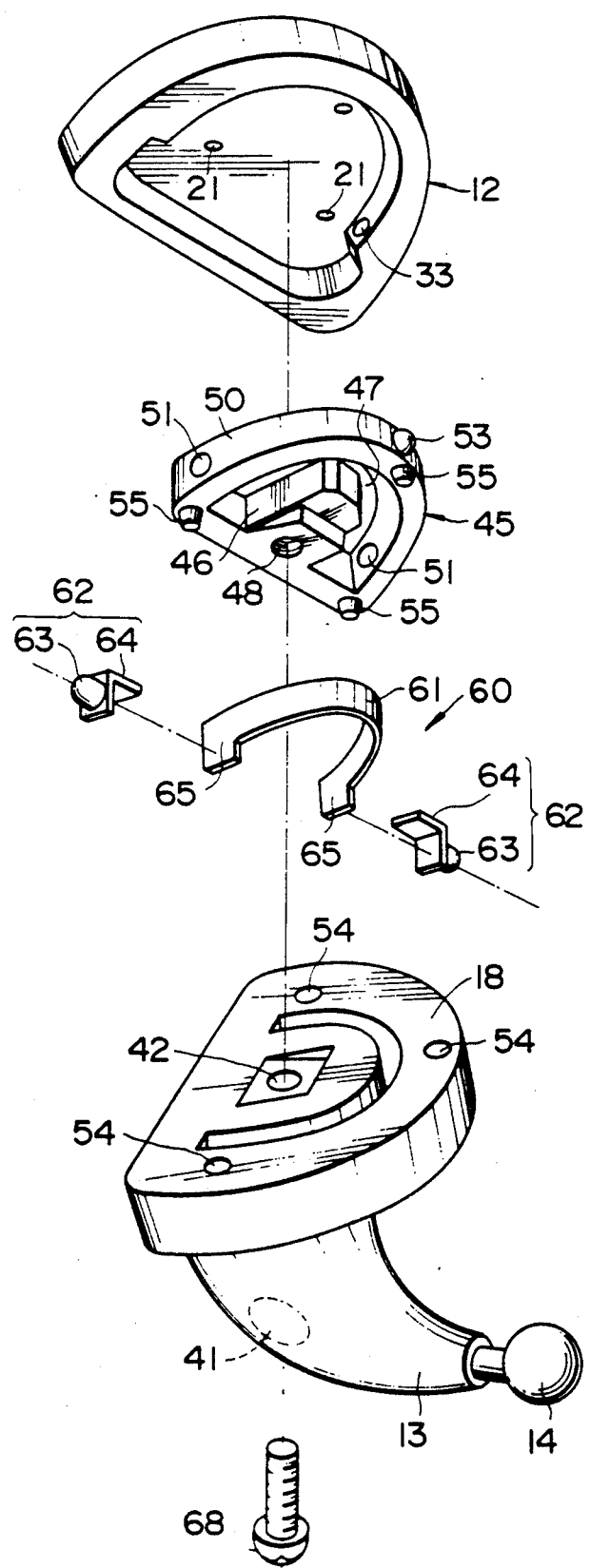
FIG. 12 is an exploded perspective view of the inside rear view mirror shown in FIG. 8.

A frame 45 is made of the same material as the stay and has a schematic half moon shape. At three locations of an upper end surface thereof, the dowels 52 are formed for determining the position where the mirror is mounted, and the dowels 52 engages to the cavity 17 provided on a bottom plate of the base 12. Further, a threaded hole 48 is provided in a center portion 46 of the frame while a U-shape groove 47 for receiving the leaf spring of the engaging means described hereinafter is formed around the center portion 46 of the frame. And on the upper surface of both sides of the base end of this U-shape groove, a rib 49 for preventing the leaf spring from dropping out is formed. There are provided on both sides of the base end of a bent outer wall 50 of the frame, through holes 51 penetrating to the U-shape groove 47 and, on an end portion, a semi-spherical projection 53 engaging the dent 24 provided on the base 12. On the frame 45, a plurality of projections 55 engaging holes 54 formed on the upper surface 43 of the stay for determining the position where the mirror is mounted, is protrudingly disposed (FIG. 12).

Now elastic engaging means 60 for attaching the frame 45 to the base 12 will be described.

The elastic engaging means 60 comprises a leaf spring 61 disposed in the frame 45, semi-spherical stoppers 62, 62 resiliently arranged near both ends of a leaf spring 61. Second dents 33, 33 are formed on an inside wall surface of the base to receive semi-spherical convexes 63, 63 of the stoppers protrudingly penetrating through both end portions of the frame 45. The semi-spherical stopper 62, 62 at a respective side of the leaf spring is formed by a L-shape base 64 and a semi-spherical convex 63.

To assemble above described attaching mechanism, as with the first embodiment, the base 12 is preliminary fixed on the interior surface 11 such as the upper portion of the front glass of the vehicle or the front periphery of the ceiling. The leaf spring is provisionally fastened to the frame 45. That is, after the semi-spherical convex 63 of the semi-spherical stopper 62 penetrates the through hole 51, 51 provided on the base end portion of the bent outer wall 50 of the frame 45, the leaf spring 61 is latched to the upper end portion of the U-shape groove 47 of the frame 45.

As above described, the frame latched with the leaf spring 61 permits the semi-spherical projection 53 provided at the end of the frame 45 to engage the first dent 24 in the cavity of the base 12 and then permits it to engage the cavity of the base 12 thus detemining the position where the mirror is mounted. Following this, both leg portions 65, 65 of the leaf spring 61 are inwardly pressed to extend into U-shape groove 47 of the frame 45 and then the pressure is released. When the pressure is released, by a pressure occured when both leg portions 65, 65 widen outwardly by a resiliency of the leaf spring, the semi-spherical stopper 62, 62 disposed on the outside of the leg portions moves outwardly. Then the semi-spherical convex 63, 63 disposed on the stopper projects from the through hole 51, 51 to the outside of the frame and engages to the second dent 33, 33 disposed in the cavity of the base 12, thereby a sub-assembly in which the frame 45 is set on the base 12 is obtained.

Then the stay 13 mounted with the mirror is arranged on the bottom surface of the frame 45 after the position is so determined that the hole 54 and the projection 55 disposed on the bottom surface of the frame are engaged with each other on the upper surface 43 of the stay. A threaded screw 68 penetrates through the large radial dimentioned hole 41 in the bottom surface of the stay and threaddedly engages the threaded hole 48 disposed of the frame 45 to secure the stay 13 to the frame 45.

According to the above described structure, the frame 45 and the base 12 are fixed with each other by an engagement of the first dent 24 in the cavity 17 of the base 12 with the semi-spherical projection 53 of the frame and further by an engagement of the second dents 33, 33 disposed on the inside wall of the cavity with the semi-spherical convexes 63, 63 of the semi-spherical stopper 62 arranged at the outside of both legs of the leaf spring 61, while the stay 13 with the mirror is threaddedly secured to the bottom surface of the frame 45 by the screw 68. Thereby, when an impact loading is applied to the pivot on the end of the stay for holding the mirror, at least one engagement of the second semi-spherical dent 33, 33 or the semi-spherical convex 63, 63 which engagingly supports the frame 45 with the base 12 is released to permit the stay 13 and the frame 45 to drop out from the base 12.

Since the inside rear view mirror of this invention is formed as above described, in case damage occurrs at the frame portion at the time of the mirror dropping out, the exchanging of the frame is enough. Further, in a conventional mechanism, it is impossible to remove that the stay which supports the mirror from the base even by loosening the screw. However in this invention, the stay is removed from the base by loosening the screw and in case of the of the main body of the mirror being damaged, the exchanging thereof is easily possible.

According to this invention, as above described, the mounting the stay to the base is simply performed without employing the special jig, and it easily drops out of the base when an external force of a relative wide range lower is applied from beneath. Therefore, there is no restricting condition in respect of the position to where the mirror is mounted as required in the conventional mechanism. The mirror may be adeqately located without directly having an effect on the driver's sight. As the frame can be adjusted for the base, it is possible to provide for mounting a various kinds of the stay.

While several forms of the invention have been shown and described, other forms will now be apparent to these skilled in the art. Therefore, it will be understood that the embodiments shown in the drawings and described above are merely for illustrative purposes, and are not intended to limit the scope of the invention which is defined by the claims which follow.

We claim:

1. An inside rear view mirror for a vehicle, comprising:
    a base to be secured to an interior surface of a vehicle and having a bottom surface and a cavity formed in said bottom surface;
    a stay detachably mounted on said bottom surface of said base and having an upper surface;
    a frame arranged at said upper surface of said stay and received in said cavity, said base having an inside wall surface defining said cavity and having a first semi-spherical dent arranged in the center of said inside wall surface and two second semi-spherical dents formed, respectively at opposite positions of said inside wall surface equally spaced from the center of said inside wall surface, said frame having a front end and a semi-spherical projection formed at said front end for engaging said first semi-spherical dent;
    elastic engaging means comprising an arc-shaped leaf spring to be located in said frame and two stoppers arranged at opposite sides of said frame, respectively;

said elastic engaging means arranged in said frame to provide for engagement of said two stoppers in said two second semi-spherical dents, respectively; and each of said two stoppers elastically engaging a respective end of said leaf spring and having a semi-spherical convex projecting through a respective end portion of said frame for engaging said respective second semi-spherical dent.

2. An inside rear view mirror as set forth in claim 1, wherein said frame is formed integrally with said stay on said upper surface of said stay.

3. An inside rear view mirror as set forth in claim 1, wherein said frame has an upper surface and a plurality of dowels formed thereon, said base having an inner surface and a plurality of holes for receiving said plurality of dowels.

4. An inside rear view mirror as set forth in claim 1, wherein a portion of said frame is provided with a provisionally fastening rib.

5. An inside rear view mirror as set forth in claim 1, wherein said frame has a semicircular shape, a center portion and a U-shaped groove on a periphery of said center portion and said center portion has a threaded hole receiving a screw for fastening said stay.

6. An inside rear view mirror for a vehicle, comprising:

a base to be secured to an interior surface of a vehicle and having a bottom surface and a cavity formed in said bottom surface;

a stay detachably mounted on said bottom surface of said base and having a lower surface and an upper surface, said stay being provided with a threaded hole formed through said stay opening onto said upper surface of the stay;

a frame integral with said stay and arranged at said upper surface of said stay and received in said cavity, said base having an inside wall surface defining said cavity and having a first semi-spherical dent arranged in the center of said inside wall surface and two second semi-spherical dents formed, respectively, at opposite positions of said inside wall surface equally spaced from the center of said inside wall surface, said frame having a front end, and a semi-spherical projection formed at said front end for engaging said first semi-spherical dent;

elastic engaging means comprising an arc-shaped leaf spring located in said frame, two stoppers arranged at opposite sides of said frame, respectively and an engaging member extending through said threaded hole from the lower surface of said stay to the upper surface of said stay;

said elastic engaging means arranged in said frame to provide for engagement of said two stoppers in said two second semi-spherical dents, respectively;

each of said two stoppers elastically engaging a respective end of said leaf spring and having a semi-spherical convex projecting through a respective end portion of said frame for engaging said respective second semi-spherical dent; and said engaging member extending through said threaded hole for progressively pushing a center of a bent portion of said leaf spring to thereby provide for engagement of the semi-spherical convexes of said stoppers with said two second semi-spherical dents, respectively.

7. An inside rear view mirror for a vehicle, comprising:

a base to be secured to an interior surface of a vehicle and having a bottom surface and a cavity formed in said bottom surface;

a stay detachably mounted on said bottom surface of said base and having an upper surface provided with a guide groove and a hole opening onto said upper surface;

a frame detachably arranged at said upper surface of said stay and received in said cavity, said base having an inside wall surface defining said cavity and having a first semi-spherical dent arranged in the center of said inside wall surface and two second semi-spherical dents formed, respectively, at opposite positions of said inside wall surface equally spaced from the center of said inside wall surface, said frame having a front end, a semi-spherical projection formed at said front end for engaging said first semi-spherical dent and a threaded hole;

elastic engaging means comprising an arc-shaped leaf spring located in said frame, two stoppers arranged at opposite sides of said frame, respectively, and an engaging member engaged in said threaded hole and each of said two stoppers including a hook-shaped base slidably received in said guide groove, elastically engaging a respective end of said leaf spring and having a semi-spherical convex projecting through a respective end portion of said frame for engaging a respective second semi-spherical dent.

* * * * *